INVENTOR
PETE E. MARENHOLTZ
BY C. A. Weigel, Jr.
ATTORNEY

Feb. 8, 1966 P. E. MARENHOLTZ 3,234,544

BI-POLAR ANALOG-TO-DIGITAL CONVERTER

Filed June 10, 1960 3 Sheets-Sheet 2

INVENTOR
PETE E. MARENHOLTZ
BY C. A. Weigel, Jr.
ATTORNEY

BI-POLAR ANALOG-TO-DIGITAL CONVERTER

Filed June 10, 1960

3 Sheets-Sheet 3

INVENTOR
PETE E. MARENHOLTZ
BY C. A. Weigel, Jr.
ATTORNEY

United States Patent Office 3,234,544
Patented Feb. 8, 1966

3,234,544
BI-POLAR ANALOG-TO-DIGITAL CONVERTER
Pete E. Marenholtz, San Diego, Calif., assignor, by mesne assignments, to Control Data Corporation, Minneapolis, Minn., a corporation of Minnesota
Filed June 10, 1960, Ser. No. 35,183
10 Claims. (Cl. 340—347)

This invention relates to an analog-to-digital converter and more particularly to an analog-to-digital converter capable of presenting the digital representation of an analog input in terms of the absolute value and polarity of the analog input.

In recent years the need has arisen for reducing analog data generated, for example, by instruments used in experimental or control applications to a more useful form. Although the advent of automatic digital computers aided in the data reduction, it became necessary to adequately and rapidly translate the instruments' output to a digital form for processing. Many different schemes have been employed to translate or convert between analog and digital representations. Several such schemes are discussed in the book, Digital Computer—Components & Circuits (by R. K. Richards; D. Van Nostrand Company, Inc., publishers, 1957). One type of analog-to-digital converter, known as a feedback type of converter (or encoder), is described beginning on page 488 of this book.

In such a converter, typically, the number in the digital register is converted to an analog voltage by a digital-to-analog converter circuit. This analog voltage is then compared with the input analog voltage to be encoded and the output of the comparator applied to a control circuit. As is described by Richards, the number in the digital register is initially reset to zero by means of the control circuit. The control circuit then causes the several flip-flops in the digital register to be set to binary 1 one at a time, the sequence being from the high-order digits to the low-order digits. At each step in the operation, the resulting digital number is converted to an analog voltage and compared with the input voltage. If the input voltage is larger than (or equal to) the converted voltage, the flip-flop is left at 1. However, if the input voltage is less, the flip-flop is reset at 0.

At the conclusion of the conversion operation, the digital representation of the analog voltage is stored in the register, and it may be transmitted from this register in parallel form to any other piece of equipment; e.g., a magnetic tape unit or a computer. This conversion method is adaptable to either the binary or the binary coded decimal system of numbers, the only distinction in the circuit being in the resistance values in the digital-to-analog converter.

While encoders of this type are among the fastest available, they have generally required relatively complex circuitry in order to maintain the required accuracy. Further, if the converter is to be built to express the result in terms of the absolute value and the sign of the unknown analog signal, some variation in logic is necessary. In the prior art, during the first trial comparison the output of the digital-to-analog converter generally is made to represent zero to determine the polarity of the unknown analog voltage. In one such converter of the type developed by the prior art; for example, if this first trial comparison yields a negative sign, the unknown analog voltage is gated through an inverting amplifier and back again to the detector so that it may be treated as a positive voltage for the remainder of the conversion process.

Another technique employed in the prior art to obtain an output in terms of the absolute value and sign of the analog voltage, utilizes the digital-to-analog converter to select either a positive or a negative reference voltage, depending upon the sign of the unknown analog voltage, as determined by the first logical trial. Unfortunately, many of these prior art analog-to-digital converters have required relatively complex circuitry at the precise point where high accuracy is important; namely, in the values of the reference voltages. As is known, such complex circuitry may be the cause of errors and inaccuracies in circuit operation as well as the cause of circuit breakdown.

Accordingly, it is an object of this invention to obviate the disadvantages of the prior art.

Another object of this invention is to more simply convert an analog voltage input signal to a digital output signal, represented in terms of the absolute value and sign of the input signal.

In the present invention, a conventional successive approximation type of analog-to-digital converter is simplified to generate a digital output in terms of the absolute value and sign of the input unknown analog voltage. Using such converter, the sign stage of the digital register is given a weight equal to the sum of the weights of all of the other stages less the weight of the least significant stage. As each of the stages are set, in sequence, beginning with the most significant, the sign stage, to represent a binary 1, the resulting numbers held in the digital register are converted to analog voltages. The unknown analog voltage is scaled and biased to match the voltage level of the digital-to-analog converter output and compared to each of the converted analog voltages. The first comparison determines the sign of the unknown analog voltage.

If the sign is determined to be positive (+), the binary 1 output of each of the flip-flops in the output register is applied to the digital-to-analog converter. If on the other hand, the unknown analog voltage is determined to be negative (—), the binary complement, of the number in the output register, or 0, output of each of the flip-flops, is applied to the digital-to-analog converter. Thus, with the arrangement shown, it is only necessary to try successively, the 1 state of each of the flip-flops commencing with the most significant, the sign, and continue down through the less significant flip-flops, returning any one to its 0 state if its 1 state produced a voltage from the digital-to-analog converter (1) greater than the unknown if the sign of the unknown is positive (+) or (2) less than the unknown if the sign of the unknown is negative. These techniques have the advantage of not requiring the unknown or reference analog voltages to be switched or gated which reduces the circuit complexity and improves the accuracy of the converter.

Further advantages and features of this invention will become apparent upon consideration of the following description read in conjunction with the drawings wherein.

Figure 1:
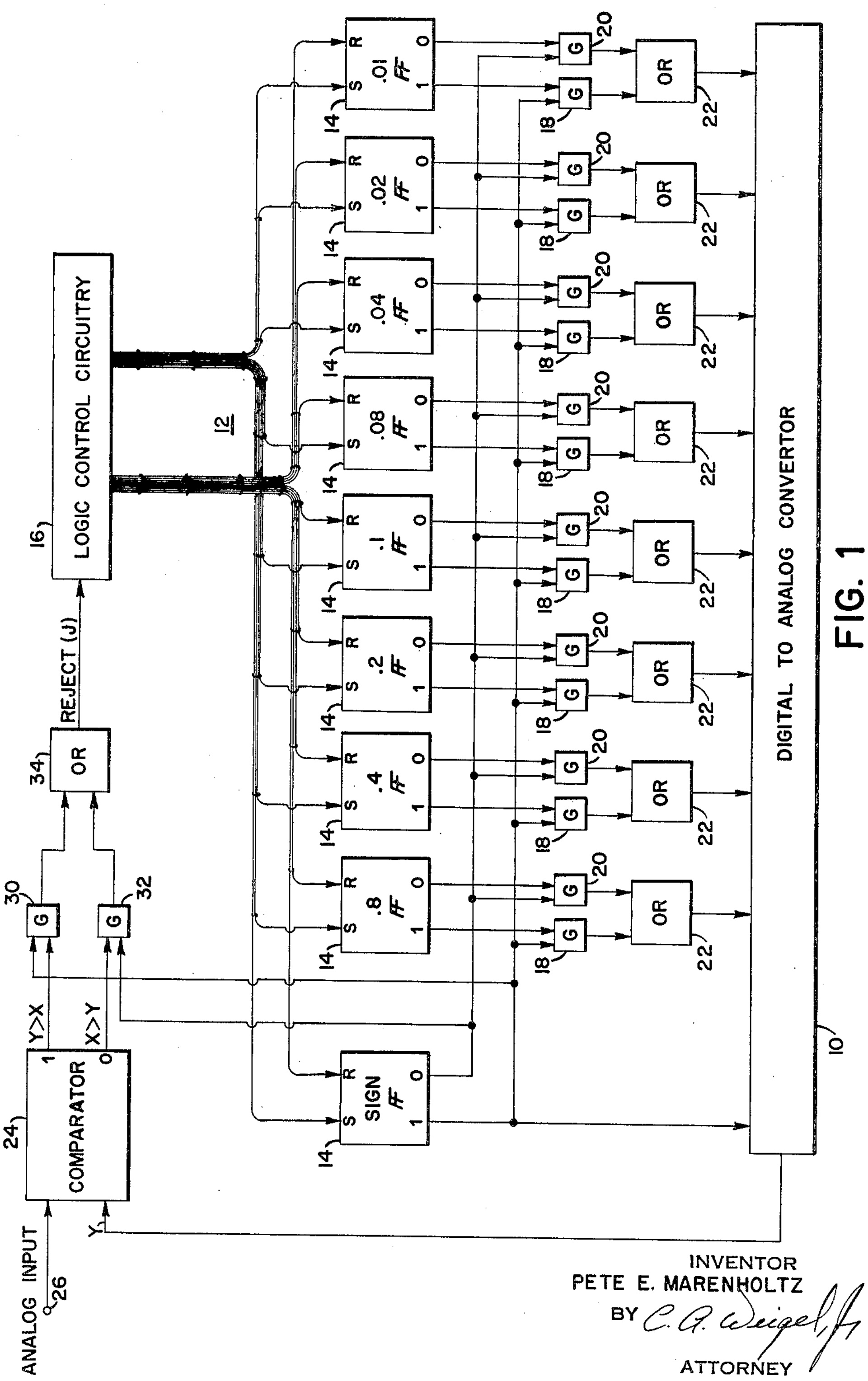
FIGURE 1 is a block diagram of an analog-to-digital converter constructed in accordance with this invention.

An analog-to-digital converter is illustrated in FIGURE 1 that includes a digital-to-analog converter 10. The digital-to-analog converter 10 may be a simple resistance network of the type illustrated and described hereinafter in conjunction with FIGURE 3. The analog-to-digital converter also includes a digital register 12 comprising a plurality of flip-flops 14. Each flip-flop 14 represents a different binary bit for storing the digital or binary coded decimal equivalent (in terms of absolute value and sign) of an analog input signal that is applied to an input terminal 26. In the drawing of FIGURE 1, the ground connections are not shown for the sake of clarity. The first one of the flip-flops 14 in the digital register 12 is a sign flip-flop which, as will be described hereinafter, is assigned a binary "weight" equal to the sum of the "weights" of the remaining flip-flops less that of the flip-flop 14 storing the least significant digit.

By way of illustration, the converter expresses its output in binary decimal 8–4–2–1 code. Accordingly, the flip-flops 14 in the digital register 12 are formed in two groups of four, each representing one decimal digit in the binary decimal 8–4–2–1 code. Thus the flip-flops 14 in sequence from left to right in the drawing of FIGURE 1 include the sign, the 0.8, the 0.4, the 0.2, the 0.1, the 0.08, the 0.04, the 0.02, and the 0.01 flip-flops 14.

Each of the flip-flops 14 is conventional, having set (S) and reset (R) inputs and corresponding 1 and 0 outputs. Their operation is such that if the set input (S) receives a trigger pulse, the flip-flop becomes set with its 1 output high and its corresponding 0 output low. Conversely, if the flip-flop is reset, its 0 output is high and the corresponding 1 output is low.

Figure 4:
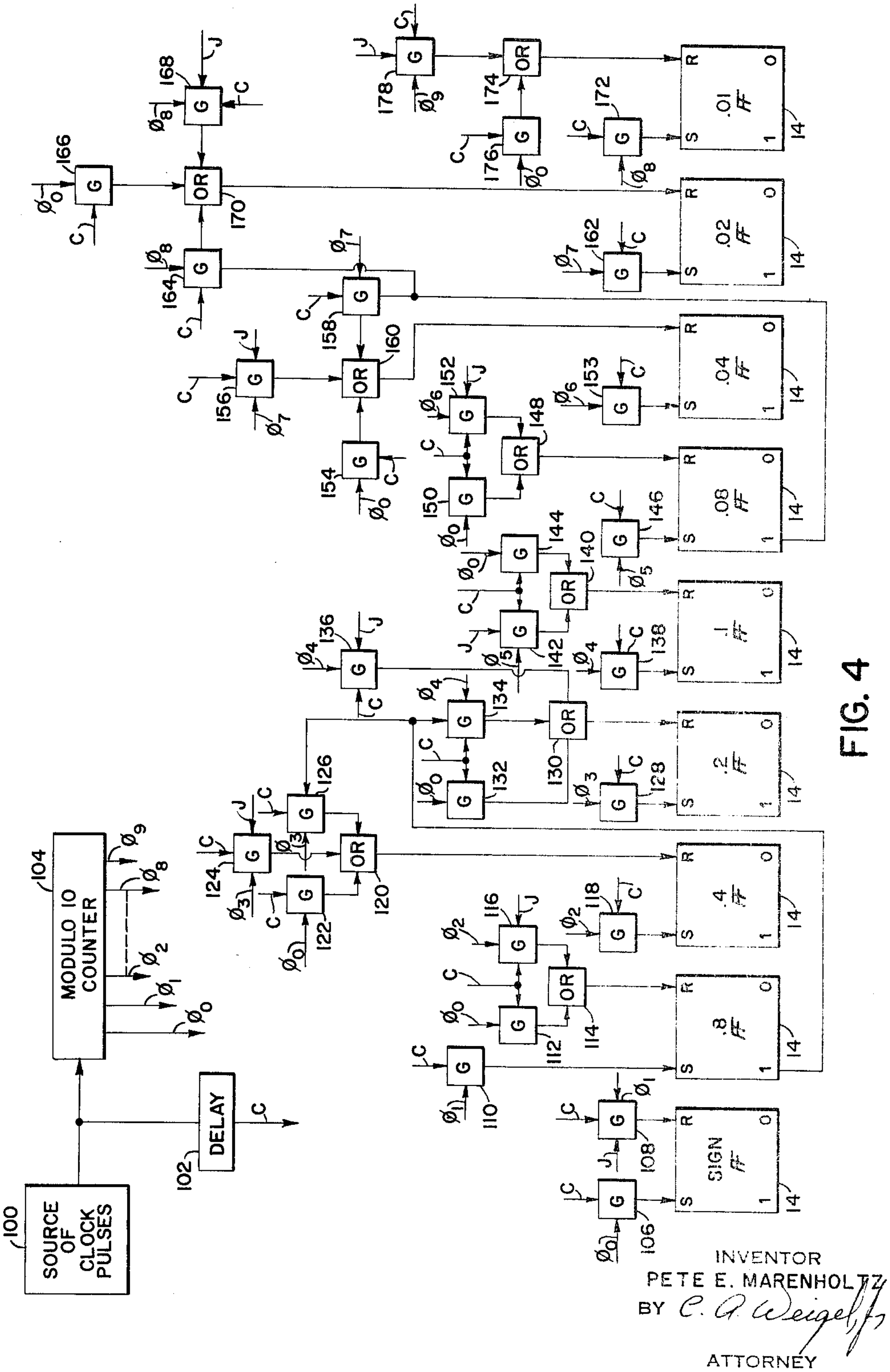
FIGURE 4 is a block diagram of the logic circuitry that may be employed in the converter illustrated in FIG. 1.

Whether the several flip-flops 14 are set or reset is determined by logic control circuitry, illustrated by the block 16, the details of which are set forth in conjunction with FIGURE 4. Suffice it to say for the present, that the function of the logic control circuitry 16 is to set (turn on) each of the several flip-flops 14 in sequence and then, under a predetermined set of conditions, reset the flip-flops to 0.

The 1 output of the sign flip-flop 14 is coupled directly to the digital-to-analog converter 10 and also to one input of each of a plurality of two input "and" gates 18. The remaining input to each of the two input "and" gates 18 is supplied by the 1 output of a different one of the 0.8, 0.4, 0.2, 0.1, 0.08, 0.04, 0.02, 0.01 flip-flops 14. In like manner, the 0 output of the sign flip-flop 14 is coupled to one input of each of a plurality of two-input "and" gates 20. The remaining input to each of the two input "and" gates 20 is supplied by the 0 output of a different one of the remaining flip-flops 14 other than the sign flip-flops 14.

Each of the pairs of "and" gates 18 and 20, that are associated with each of the numeral (those other than the sign) flip-flops 14, is connected to a corresponding "or" circuit 22 (which may include drive circuitry). The output of each of the "or" circuits 22, in turn, is connected to the digital-to-analog converter 10. The analog output signal from the digital-to-analog converter 10 is connected to one input of a comparator and scaling circuit 24, which is termed simply a comparator 24.

The details of this comparator and scaling circuit 24 are illustrated hereinafter in conjunction with FIGURE 2. For the present, it may be said that the function of this comparator and scaling circuit 24 is to scale and bias the unknown analog input voltage supplied at the input terminal 26 to match the digital-to-analog converter output. For ease of description, the analog output signal of the digital-to-analog converter is denoted by the letter Y, whereas the scaled and biased voltage signal representing the analog input voltage signal appearing at the terminal 26 is denoted by the letter X. In its operation, the comparator 24 determines which of the X and Y analog voltages is the greater in magnitude.

The comparator 24 is capable of providing output signals having either of two levels to conform to the logic voltages employed in the logic circuitry described herein. Since these outputs have two states ($Y>X$ or $X>Y$) as do the flip-flops 14, corresponding 1 and 0 designations have been employed in the comparator 24. Thus, the 1 output of the comparator 24 is high if the Y signal from the digital-to-analog converter is more positive than the X signal. Conversely, the 0 output is high if the X signal is more positive than the Y signal. The 1 output of the comparator 24 is coupled to one input of a two input "and" gate 30, the remaining input of which is supplied by the 1 output of the sign flip-flop 14. A second two input "and" gate 32 receives one input from the 0 output of the comparator 24 and a second input from the 0 output of the sign flip-flop 14. Each of the "and" gates 30 and 32 in turn is connected to an "or" circuit 34 to provide a reject (J) signal to the logic control circuitry 16 in the event of an output signal from either of the "and" gates 30 and 32.

The logic voltage levels employed with this invention are, by way of illustration, zero or some specified negative voltage −E, corresponding to the binary bits 1 and 0, respectively. As will be described in conjunction with FIG. 3 the value of the several resistances in the digital-to-analog converted 10 are chosen so that each allows an amount of current flow that is proportional to the weight or significance of its respective binary bit (flip-flop 14). As mentioned hereinbefore, the weight of the sign input to the digital-to-analog converter 10 is equal to the sum of the weights of all of the numeral inputs less the weight of the least significant numeral input. In the present example, in which a two decimal digit converter having a full scale of +0.99 is provided, the weight of the sign input is 1.64; i.e.

$$(0.8+0.4+0.2+0.1+0.08+0.04+0.02+0.01-0.01)$$

In the first logical step of operation, the number in the digital register 12 is initially set to zero by means of the logic control circuit 16. The control circuit 16 then sets the several flip-flops 14 in the digital register 12, one at a time, the sequence being from the high order binary bits (stages) to the low order bits (stages). At each step of the operation the resulting binary decimal member is converted to the analog voltage Y and compared with the scaled and biased input voltage X. As a result of these comparisons, the several flip-flops 14 are selectively reset until each flip-flop 14 is tried and the digital register 12 holds the digital equivalent of the analog input voltage.

Considering now the details of this sequence, in the first logical step, the several flip-flops 14 are reset to zero. Next, the sign flip-flop 14 is set to determine whether the input voltage is positive or negative. With the 1 output of the sign flip-flop 14 high, the output provided by the digital-to-analog converter 10 is 1.64 in arbitrary units. To bias and scale the input analog voltage to match the output of the digital-to-analog converter 10, zero in the unknown is represented by +1.645 in arbitrary units. Accordingly, a positive full scale of the input voltage (+.99) is represented by +2.635 in arbitrary units. Conversely, negative full scale input voltage (−0.99) is represented by +0.655 in arbitrary units.

The connection between the output register 12 and the digital-to-analog converter 10 depends upon the state of the sign flip-flop 14 and hence on whether the unknown is positive or negative. If, for example, the sign flip-flop 14 is set, representing a plus sign, the numeral inputs to the digital-to-analog converter 10 are controlled by the 1 outputs of the remaining digital register 12, numeral flip-flops 14. Conversely, they are controlled by the 0 outputs of the numeral flip-flops 14 if the sign flip-flop 14 is reset. Thus, if a plus sign is represented by the sign flip-flop 14 (the sign flip-flop is set), the less significant binary bits in the digital register 12 add their weight to the output when set. If, on the other hand, a minus sign is represented (the sign flip-flop 14 is reset), the less significant bits subtract their weight in the digital-to-analog converter 10 when set.

Now, if the voltage produced by the digital-to-analog converter 10, as each flip-flop 14 is set, has a magnitude exceeding that of the unknown, the respective flip-flop 14 is reset by a reject signal (J) from the comparator 24.

Since the comparator 24 is comparing two inputs and characteristically can sense only which one is more positive, it is necessary that the comparator 24 be conditioned by the state of the sign flip-flop 14. If the sign flip-flop 14 is set (representing a positive analog input) the comparator 24 rejects subsequent trials of the numerical flip-flops 14 when their set state produces an analog output voltage from the digital-to-analog converter 10 more positive than the unknown scaled voltage X. If the sign flip-flop is false, however, subsequent flip-flops are reset if their set state produces a digital-to-analog converter 10 output more negative than the unknown scaled voltage X.

To aid in understanding the operation of the invention, an illustrative example is given. If, for example, the unknown analog input voltage to be digitized is −0.29 volt, this signal is represented by +1.355 after scaling and biasing (1.645−0.29) in the comparator 24. For the first trial, the logic control circuitry 16, after initially resetting each of the flip-flops 14, sets the sign flip-flop 14, such that the register 12 is 1 0000 0000. Since the sign flip-flop 14 has been given the weight of 1.64, the digital-to-analog converter 10 produces a voltage of 1.64 (in arbitrary units) which passes to the comparator 24. Since the signal from the digital-to-analog converter 10 is more positive than the scaled and biased analog input signal X (1.355), the two input "and" gate 30, primed by the high 1 output of the sign flip-flop 14, passes a voltage level from the 1 output of the comparator 24 through the "or" circuit 34 to generate a reject signal J which passes to the logic control circuitry 16. The logic control circuitry resets the sign flip-flop 14 and sets the next consecutive flip-flop 14, which is the .8 flip-flop 14. Thus, on the next trial, the register 12 holds 0 1000 0000. Now all of the inputs to the digital-to-analog converter except the 0.8 and the sign are high (since the sign flip-flop couples the 0 outputs to the converter 10) and the voltage produced by the digital-to-analog converter 10 is 0.85 (.4+.2+.1+.08+.04+.02+.01) in arbitrary units.

Since the sign flip-flop is reset, the analog signal representing the .8 flip-flop 14 is rejected because it produces an output 0.85 more negative than the unknown 1.355. That is, the second "and" gate 32, being primed by the high 0 output of the sign flip-flop 14, passes the high level from the 0 output of the comparator 24 indicating that X, the unknown analog input voltage, is greater than Y, the analog signal received from the digital-to-analog converter 10. Stated in another manner, for negative numbers the digital-to-analog converter output voltage must be more positive than the scaled and biased input analog voltage X in order to be retained. Otherwise, the number held in the output register 12 is more negative than that of the analog input voltage to be digitized.

For the next try, the digital register 12 is set at 0 0100 0000 to produce a voltage of 1.25 which is compared in the comparator 24 and rejected because it produces an output voltage Y more negative than the unknown.

The next trial is of decimal .2. In this instance, the digital register 12 is set at 0 0010 0000 to provide an output from the digital-to-analog converter of 1.45. Since the 1.45 output from the digital-to-analog converter 10 is more positive than the scaled and biased analog input voltage X, the .2 flip-flop 14 is not reset and thus is allowed to hold a binary 1. This process continues with the remaining flip-flops 14, each successively set and then conditionally reset (depending upon the results of the comparison of the resulting analog output voltage Y to the scaled and biased input voltage X) until the number is digitized.

The following chart summarizes this process of trial and rejection of the several binary bits in digitizing the analog input voltage:

Digitizing 1.355 (−0.29) input

| Try decimal | Binary dec. | D/A output(Y) | Result |
|---|---|---|---|
| +0.00 | 1 0000 0000 | 1.64 | Reject. |
| −0.80 | 0 1000 0000 | .85 | Do. |
| −0.40 | 0 0100 0000 | 1.25 | Do. |
| −0.20 | 0 0010 0000 | 1.45 | Save. |
| −0.30 | 0 0011 0000 | 1.35 | Reject. |
| −0.28 | 0 0010 1000 | 1.37 | Save. |
| −0.32 | 0 0010 1100 | 1.33 | Reject. |
| −0.30 | 0 0010 1010 | 1.35 | Do. |
| −0.29 | 0 0010 1001 | 1.36 | Save. |

The use of the binary complement of the number stored in the output register 12 offers several advantages. One is that switching is performed on digital signals rather than analog signals as in the prior art. This results in a converter that is less complex and generally capable of greater accuracy than those of the prior art.

Figure 2:
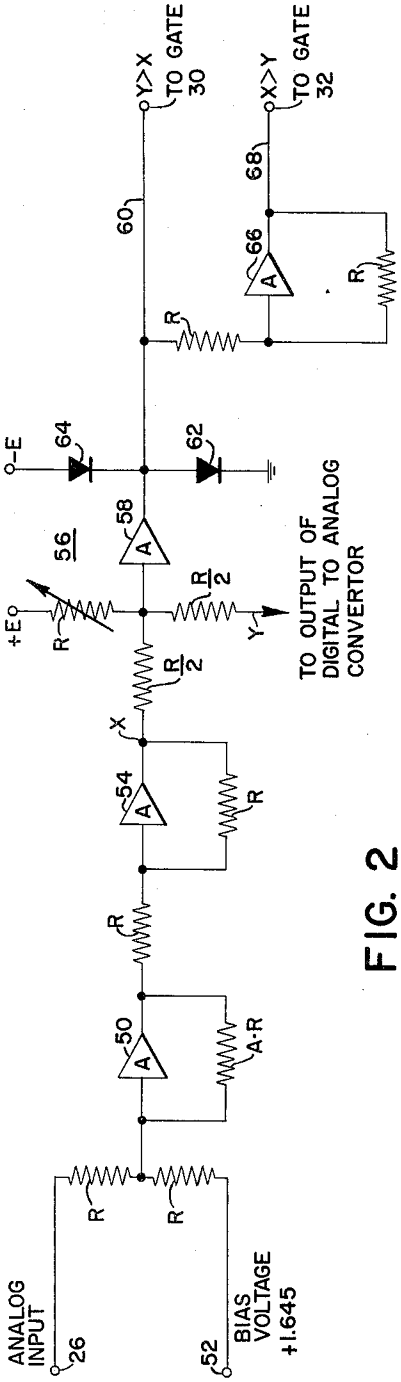
FIGURE 2 is a partial block and partial schematic diagram of a comparator circuit that may be utilized for the comparator illustrated in FIG. 1.

FIGURE 2 illustrates the details of the biasing and scaling function and comparing function performed by the block illustrated as a comparator 24. Thus, the unknown analog voltage from the input terminal 26 (the ground terminal is omitted for the sake of clarity) is coupled through a resistor R to the input of an operational amplifier 50. Also a source of bias voltage, illustrated by the terminal 52, is applied through a second resistor R to the input of the operational amplifier 50. The bias voltage 52 may have a value of +1.645 volts. This particular value is selected such that if the input voltage is zero, such input voltage is raised to the value of the bias voltage 1.645, which is .005 volt above the arbitrarily selected weight of the sign input of 1.64. In this manner, if the input voltage is zero, a zero in the unknown voltage produces a high voltage level on the 0 output from the comparator 24 (FIG. 1), which is blocked by the second "and" gate 52. Hence, a positive sign is stored by the sign flip-flop 14 (FIG. 1).

The operational amplifier 50 may be similar to that illustrated in FIGURE 11–6 (*c*) on page 484 of the Richards text.

Thus, the output voltage derived from the operational amplifier 50 is equal to the negative sum of the input voltages; i.e., the analog input plus the bias voltage, scaled or multiplied by a factor A which is the factor by which the feedback resistor of the operatonal amplifier 50 exceeds the two input resistors R. The value of this feedback $A \cdot R$ may be selected to provide the desired digital output for an input voltage of given magnitude. The output of the operational amplifier 50 is passed through an inverting operational amplifier 54 having an input resistor R and a feedback resistor R, of equal value, to produce an analog output voltage X which is the unknown analog voltage applied to the input terminal 26, now scaled and biased to match the digital-to-analog converter output Y.

The scaled and biased analog voltage X is coupled to a detector circuit 56 which includes an operational amplifier 58 having no feedback resistor in order to achieve maximum gain, and three input resistors R, $R/2$, and $R/2$. As with amplifiers 50 and 54, amplifier 58 also inverts the signal polarity. The scaled and biased analog input signal X (which will always be of positive polarity) is coupled through one of the resistors $R/2$ to the input of the operational amplifier 58. In a similar manner, the analog output signal Y of the digital-to-analog converter 10 is coupled through the second resistor $R/2$ to the operational amplifier 58. As will be seen, the Y signal will always be of negative polarity. Finally a source of voltage +E is coupled through a variable resistor R to the operational amplifier 58 to provide a zero adjustment. To conform with the logic voltage levels that may typically be employed in a digital type system, the voltages representing binary 1 and binary 0, respectively, may be 0 and −E volts, respectively. The +E volt source and the adjustment of the variable resistor R are selected so that the output of the operational amplifier 58 is at a desired quiescent value in the absence of any other voltages at the input thereof. Preferably, this quiescent output level is midway between the 0 and −E logic levels.

If, for example, the (negative) analog output Y of the digital-to-analog converter 10 is larger in magnitude than the (positive) scaled and biased analog input signal X, then an additional signal component of negative polarity appears at the input of amplifier 58. This signal component is amplified and inverted by the amplifier 58 so that the output of amplifier 58 tends to go positive. As a conseqeunce, output lead 60 is clamped at ground or zero level by a diode clamp 62. In similar manner, if the scaled and biased analog input signal X is larger in magnitude than the output Y of the digital-to-analog converter 10, then an additional signal component of positive polarity appears at the input of amplifier 58. This signal component is amplified and inverted by the amplifier 58 so that the output of amplifier 58 tends to go more negative than −E volts. As a consequence, output lead 60 is clamped at a level of −E volts by a second diode 64. The −E volt signal is passed through an inverting operational amplifier 66 to the lower output lead 68 to provide an input to the gate 32 (FIG. 1). Thus, it is apparent that the output lead 60 may be considered as the 1 output of the comparator 24 (FIG. 1) whereas the lower output lead 68 may be considered as the 0 output of the comparator 24.

Thus in operation, the circuit of FIG. 2, biases and scales the analog input voltage at terminal 26 such that zero in the unknown is represented by +1.645, positive full scale (+.99) by 2.635, and negative full scale (−0.99) by +0.655. This biased and scaled analog input X is then compared in the comparator 56 to the output Y of the digital-to-analog converter 10 to provide a high output signal to the first gate 30 (FIG. 1) if the Y signal exceeds the X signal and conversely, a high output signal on the lower output lead 68 to the gate 32 (FIG. 1) if the X signal exceeds the Y signal. Alternatively, of course, the digital-to-analog converter 10 output Y may be scaled and biased by a similar circuit to that described in FIG. 2 to match the voltage of the unknown.

Figure 3:
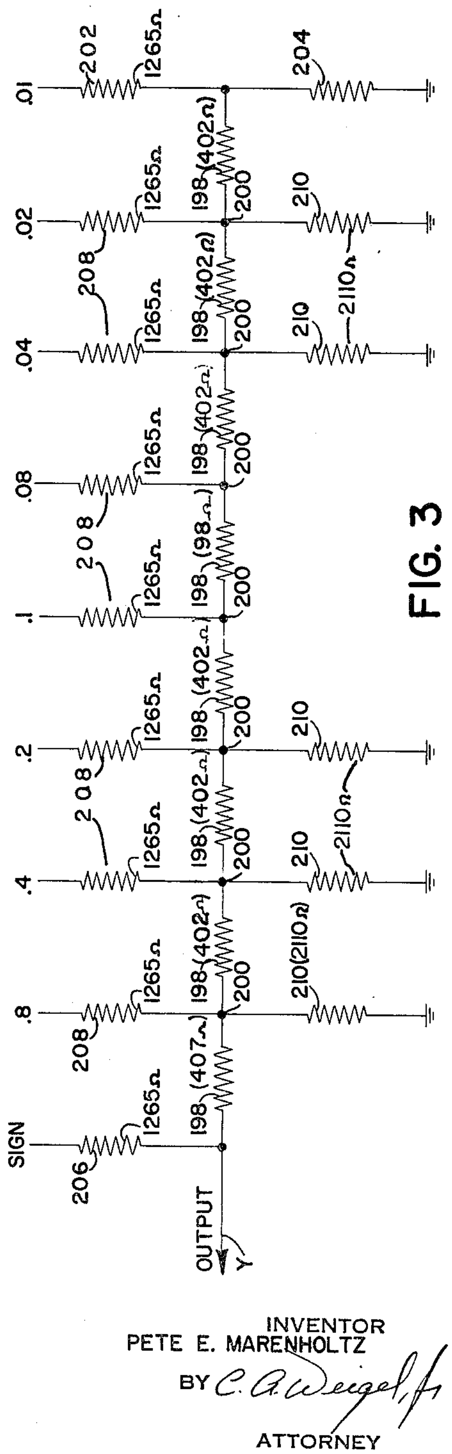
FIGURE 3 is a schematic diagram of a conventional resistance type digital-to-analog converter that may be employed in the converter illustrated in FIG. 1.

FIGURE 3 illustrates the details of a suitable digital-to-analog converter 10 utilizing a resistor network to convert the binary signals received from the several "or" circuits 22 (FIG. 1) to the analog output signal Y. The digital-to-analog converter 10 circuitry includes a string of serially connected resistors 198 having their values in ohms as illustrated. The last 402 ohm resistor 198 is terminated by a resistor 202 which is connected to the output of the "or" circuit 22 from the .01 flip-flop 14 (FIG. 1). This last 402 ohm resistor 198 is also terminated by a resistor 204 connected to ground. The other end of the serial string of resistors 198 is coupled through another resistor 206 to the 1 output of the sign flip-flop 14 (FIG. 1) and to the Y input of the comparator 24 (FIG. 1). The intersections 200 of the remaining serially connected resistors 198 are each connected through a different 1265 ohm resistor 208 to corresponding "or" circuits 22 (FIG. 1) of each of the flip-flops 14 in the digital register 12 (FIG. 1). In like manner, the resistor 208 associated with the .8, .4, .2, .04, .02 flip-flops 14 (FIG. 1) are connected through respective resistors 210 to ground.

In operation, the "or" circuits 22 (FIG. 1) which may be connected through conventional switching circuits (assumed to have negligible resistances) that may include a complementary pair of transistors connected in a common emitter configuration such that a high level from the respective flip-flops 14 (FIG. 1) causes a −E voltage to be applied to the respective input resistors 208 of the digital-to-analog converter 10 network. Conversely, a low output from the respective flip-flop 14 will cause a 0 volt signal to be applied from the "or" circuits 22 to the respective inputs of the converter 10.

It is thus apparent that the analog output signal Y can vary, depending upon the number stored in the digital register 12, between the limits of 0 and −E volts. Simply stated, the converter 10 weights the outputs of the digital register 12 in the manner described hereinbefore. Inputs from the sign or .8 flip-flops 14, for example, produce a far greater current than the inputs from the .01 flip-flop 14 (FIG. 1), for example. As the output register stores a larger positive number, the output Y of the digital-to-analog converter becomes more negative. Conversely, as the positive number stored in the output register 12 becomes smaller, the output Y from the digital-to-analog converter 10 becomes less positive.

Finally, FIGURE 4 illustrates the details of a typical logic control circuit that may be employed in the block 16 of FIG. 1. In FIG. 4 there is a source of clock pulses 100 which may, for example, be a free-running astable multivibrator having some specific clock rate at which it is desired to operate the converter. The outputs of the source of clock pulses 100 are coupled through a delay line 102 to provide sequential clock pulses C to the logic circuitry illustrated in FIG. 4. In addition, the output of the clock pulse source 100 is coupled to a modulo 10 counter 104 which provides a sequence of 10 binary 1 timing signals which are designated $\phi_0$ through $\phi_9$ inclusive. Circuit connections to each of the several gates illustrated in FIG. 4 are omitted for the sake of clarity. Each of the flip-flops 14 making up the digital register 12 of FIG. 1 are again illustrated, without their respective output connections, to show the specific logic circuitry that is employed. This logic circuitry 16 (FIG. 1) sequentially sets each of the flip-flops and then resets each flip-flop if the proper conditions exist as described hereinbefore. Thus, the sign flip-flop 14 set input S is connected to receive an input from a two input "and" gate 106. In turn, the "and" gate 106 is connected to receive the clock pulse C and the first timing level, $\phi_0$. As is known, an "and" gate generates an output signal if all of its inputs are present and at a high voltage level (zero volts to conform to the logic voltages illustrated in this description). In like manner, the reset input R of the sign flip-flop 14 is triggered by a three input "and" gate 108 which, in turn, is primed by the reject signal (J) from the "or" circuit 34 (FIG. 1) and the second timing level $\phi_1$ to provide an output pulse upon the occurrence of the clock pulse C. The set input S to the 0.8 flip-flop 14 is connected to the output of a two input "and" gate 110. The two input "and" gate 110 is connected to receive the second timing level $\phi_1$ and the clock pulse C. Its output is connected to the set inputs of the 0.8 flip-flop 14. The reset input R of the 0.8 flip-flop 14 is triggered by the output of an "or" circuit 114 receiving inputs from either of a two input "and" gate 112 or a three input "and" gate 116. The two input "and" gate 112 is connected to receive the first timing level $\phi_0$ and the clock pulse C whereas the three input "and" gate 116 receives inputs from the clock pulse C, the third timing level $\phi_2$, and the reject signal (J).

The 0.4 flip-flop 14 is set by the output of a two input "and" gate 118 receiving inputs from the third timing level $\phi_2$ and the clock pulse C. The reset input R of 0.4 flip-flop 14 is triggered by the output of an "or" circuit 120 receiving inputs from any one of a two input "and" gate 122, a three input "and" gate 124, or a three input "and" gate 126. The two input "and" gate 122 is connected to receive the first timing level $\phi_0$ and the clock pulse C. The three input "and" gate 124 is connected to receive the fourth timing level $\phi_3$, the clock pulse C, and the reject signal (J). The three input "and" gate 126 has inputs from the 1 output of the 0.8 flip-flop 14, the fourth timing level $\phi_3$, and the clock pulse C.

In like manner, the 0.2 flip-flop 14 set input S is connected to the output of a two input "and" gate which in turn receives inputs from the fourth timing level $\phi_3$ and the clock pulse C. The reset input R of the 0.2 flip-flop 14 is connected to receive the output of an "or" circuit 130 which in turn receives inputs from any one of a two input "and" gate 132, a three input "and" gate 134, or a three input "and" gate 136. The two input "and" gate 132 is primed by the first timing level $\phi_0$ to pass the clock pulse C. In like manner, the two input "and" gate 134 is connected to receive inputs from the clock pulse C, the 1 output of the 0.8 flip-flop 14, and the fifth timing level $\phi_4$. Finally, the three input "and" gate 136 receives inputs from the clock pulse C, the fifth timing level $\phi_4$ and the reject signal (J). The two input "and" gate 138, receiving inputs from the fifth timing level $\phi_4$ and the clock pulse C, provides an input to the set input S of the 0.1 flip-flop 14. Similarly, a two input "or" circuit 140 is connected to the reset input R of the 0.1 flip-flop 14. In turn, the "or" circuit 140 is connected to receive inputs from either of a three input "and" gate 142, or a two input "and" gate 144. The three input "and" gate 142 is connected to be primed by the sixth timing level $\phi_5$ and the reject signal (J) and gated by occurrence of the clock pulse C. In like manner, the two input "and" gate 144 is connected to receive inputs from the first timing level $\phi_0$ and the clock pulse C.

A two input "and" gate 146 is connected to receive the sixth timing level $\phi_5$ and the clock pulse C, to pass an output to the set input S of the 0.08 flip-flop 14. The reset input R of the 0.08 flip-flop 14 is triggered by the output of an "or" circuit 148 which in turn is connected to the output of a two input "and" gate 150 and a three input "and" gate 152. The two input "and" gate 150 is primed by the first timing level $\phi_0$ and gated by the clock pulse C. The three input "and" gate is connected to receive the seventh timing level $\phi_6$, the reject signal (J), and the clock pulse C.

Three "and" gates, a two input "and" gate 154, a three input "and" gate 156 and a three input "and" gate 158 are each coupled through an "or" circuit 160 to the reset input R of the 0.04 flip-flop 14. In turn, the two input "and" gate 154 is primed by the first timing level $\phi_0$ and gated by the clock pulse C. The three input "and" gate 156 is connected to be primed by the eighth timing level $\phi_7$, the reject signal (J), and gated by the clock pulse C. Finally, the three input "and" gate 158 is connected to be primed by the 1 output of the 0.08 flip-flop 14, the eighth timing level $\phi_7$, and gated by the clock pulse C such that the 0.04 flip-flop 14 is always reset if the 0.08 flip-flop is set thereby to prevent the registering of numbers larger than .99. The 0.02 flip-flop 14 is set by the output of a gate 162 which is connected to be primed by the eighth timing level $\phi_7$ and gated by the clock pulse C. Also, three "and" gates, including a three input "and" gate 164, a two input "and" gate 166, and a three input "and" gate 168 are coupled through an "or" circuit 170 to the reset input R of the 0.02 flip-flop 14. The three input "and" gate 164 is connected to be primed by the 1 output of the 0.08 flip-flop 14, and the ninth timing level $\phi_8$ such as to reset the 0.02 flip-flop 14 on the occurrence of the clock pulse C in the event the 0.08 flip-flop 14 is set. The two input "and" gate 166 is connected to be primed by the first timing level $\phi_0$ and gated by the clock pulse C. In like manner the three input "and" gate 168 is connected to be primed by the ninth timing level $\phi_8$, the reject signal (J) and gated by the clock pulse C.

Lastly, the 0.01 flip-flop 14 is set by the output of a two input "and" gate 172 which in turn is connected to be primed by the ninth timing level $\phi_8$ and gated by the clock pulse C. This same 0.01 flip-flop 14 is reset by the output of an "or" circuit 174. The "or" circuit 174 is connected to receive one input from a two input "and" gate 176 and a second input from a three input "and" gate 178. The two input "and" gate 176 receives an input from the first timing level $\phi_0$ and the clock pulse C. The three input "and" gate 178 receives inputs from the tenth timing level $\phi_9$, the reject signal (J) and the clock pulse C.

With the occurrence of the first timing level $\phi_0$, each of the numeral .8, .4, .2, .1, .08, .04, .02 and .01 flip-flops 14 are reset by the respective "and" gates 112, 132, 144, 150, 154, 166 and 176. At the same time the sign flip-flop, receiving an input from the two input "and" gate 106, is set such that its 1 output becomes high (namely, zero volts with the logic voltages assumed for this description). If a reject signal (J) is received from the "or" circuit (FIG. 1), with the occurrence of the second timing level $\phi_1$, the "and" gate 108, passes the clock pulse C, which is delayed slightly by the delay line 102 so as to allow the modulo 10 counter to establish a timing level to reset the sign flip-flop 14. Simultaneously with the occurrence of the second timing level $\phi_1$, the clock pulse C passes through the two input "and" gate 110 to set the .8 flip-flop 14. Thus set, the 1 output of the .8 flip-flop 14 is high. The digital-to-analog converter 10 (FIG. 1) generates an analog output voltage Y corresponding thereto which is compared to the scaled and biased analog input voltage X. If the analog output voltage Y is determined to be less than the analog input voltage the "and" gate 32 (FIG. 1) generates a reject signal (J) for the "or" circuit 34. The "and" gate 116, primed by the reject signal (J) and the third timing level $\phi_2$, passes the clock pulse C to reset the .8 flip-flop 14. It is believed that further description of the details of the operation of the logic circuitry of FIG. 4 is unnecessary since the setting and conditional resetting of the several flip-flops 14 is accomplished as just described. The particular gating that occurs in each instance is dependent on the logic voltage levels that are present. This sequence continues, as described, such that with the occurrence of each successive timing level, $\phi_2$ through $\phi_9$ the several flip-flops 14 in sequence are first set and then, with the conditional occurrence of either a reject (J) signal, or the .8, or .08 flip-flops 14 being set, reset until the digital representation of the input voltage is registered.

It should be apparent to those skilled in the art that certain modifications of the apparatus of this invention can be made. For example, instead of a binary coded decimal converter, a straight binary analog-to-digital converter may be constructed. In this instance, the value of the resistors in the digital-to-analog converter 10, illustrated in detail in FIG. 3, would have to be modified to establish weights for the several flip-flops 14 corresponding to their new binary values. The values of the several resistors are chosen so that each allows an amount of current to flow to the comparator 24 (FIG. 1) that is proportional to the weight or significance of its respective binary digit. Also, the signal from the digital-to-analog converter 10 (FIG. 1) may be scaled and biased to match the input analog signal, if desired.

The analog-to-digital converter of this invention obviates the need for gating the input signal or the reference voltage signal to effect the conversion as often required by the various techniques of the prior art. The elimination of the gating requirement reduces many of the inaccuracies which have been inherent in prior art converters.

There has thus been described a fast acting relatively simple and yet accurate analog-to-digital converter of the feedback type. This converter is capable of providing a digital representation of an input analog signal that is represented in terms of the absolute value and sign of the analog input voltage. That feature of the invention whereby the sign flip-flop is employed to vary the weight applied to the stages of the digital output register, by effectively complementing the output of the digital output register, is a feature which greatly simplifies the operation of the converter and allows a relatively high accuracy to be maintained.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a feedback type of analog-to-digital converter for converting an analog input signal to a digital signal representation thereof in terms of absolute value and sign, including a digital register having a plurality of binary stages for storing said digital signal representation, each of said stages having a normal and a binary complement output, the combination of: a digital-to-analog converter, means responsive to the sign stage of said register and to said digital-to-analog converter for determining the sign of said input signal, means responsive to said sign stage for selectively coupling the normal output and the binary complement output of each of said stages other than said sign stage to said digital-to-analog converter, means for sequentially setting each of said stages to represent a binary one, and means responsive to said sign stage and to said digital-to-analog converter for conditionally resetting each of said stages in sequences to represent a binary zero if the signal produced by said digital-to-analog converter has an absolute value greater in magnitude than the absolute value of said input signal.

2. In a feedback type of analog-to-digital converter for converting an analog input signal to a digital signal representation thereof in terms of absolute value and sign, including a digital register having a plurality of binary stages for storing said digital signal representation, control means for sequentially switching each of said stages from a first state to a second state, the sequentce being from the high order digits to the low order digits, each of said stages providing first and second output signals corresponding to said first and second states, the combination of: a digital-to-analog converter; means to couple the first output signal of each of the stages of said register to said digital-to-analog converter, thereby to produce an analog output signal representation of said digital signal representation, means for comparing said analog input signal to said analog output signal; and gating means responsive to said sign stage second output signal for selectively coupling the second output signals of each of said stages except said sign stage to said digital-to-analog converter; said control means including means responsive to said sign stage and to said comparing means for switching each of said stages from said second state to said first state; whereby said digital signal representation of said input signal is stored in said register.

3. In a feedback type of analog-to-digital converter for converting an analog input signal to a digital signal representation in terms of absolute value and sign of said input signal, including a digital register having a plurality of binary stages for storing said digital signal representation, the combination of: a digital-to-analog converter; means to couple the stages of said register to said digital-to-analog converter, thereby to produce an analog output signal corresponding to said digital signal representation, said stages each being given a weight by said digital-to-analog converter according to their significance in said digital register, gating means responsive to said sign stage for selectively coupling the binary complements of each of said stages, except said sign stage, to said digital-to-analog converter; and means for sequentially switching each of said stages from a first binary state to a second binary state, and control means responsive to said sign stage and to said comparing means for returning each of said stages to said first binary state it said digital signal representation produces an analog output signal having an absolute magnitude greater than the absolute magnitude of said analog input signal.

4. In a feedback type of analog-to-digital converter for converting an analog input signal to a digital signal representation of said input signal in terms of absolute value and sign, including a digital register having a plurality of binary stages for storing digital signals representing the absolute value and sign of a number, control means for sequentially switching each of said stages one at a time from a first state to a second state, the sequence being from the high order digits to the low order digits, the combination of: a digital-to-analog covenrter; means to couple the stages of said register to said digital-to-analog converter, thereby to produce an analog output signal representation of said number; comparing means including first means for producing a first output signal in the event said analog output signal is greater in magnitude than said analog input signal, and second means for producing a second output signal in the event said analog input signal is greater in magnitude than said analog output signal; and means responsive alternatively to the simultaneous occurrence of said first output signal and said sign stage being in said second state and to the simultaneous occurrence of said second output signal and said sign stage being in said first state for sequentially switching each of said stages from said second state to said first state, whereby the digital signal representation of said input signal is stored in said register.

5. In a feedback type of analog-to-digital converter for converting an analog input signal to a digital signal representation, including a digital register having a plurality of binary stages for storing digital signals representing the absolute value and sign of a number, control means for sequentially switching each of said stages one at a time from a first state to a second state, the sequence being from the high order digits to the low order digits, the combination of: a digital-to-analog converter; means to couple the stages of said register to said digital-to-analog converter, thereby to produce an analog signal representation of said number, said stages each being given weight by said digital-to-analog converter according to their significance in said digital register, the weight of that stage representing the sign being equal to the sum of the weights of all other stages less the weight of the least significant stage; means including said sign stage for determining the sign of said analog input signal; and means responsive to said sign stage representing a negative input signal for coupling the binary complements of each of said stages other than said sign stage to said digital-to-analog converter; said control means including means responsive to said sign stage for sequentially returning each of said stages to said first state in the event the analog representation of said number is greater in absolute magnitude than the absolute magnitude of said input signal, whereby said input signal is accurately represented in terms of absolute value and sign.

6. Apparatus employing a digital-to-analog voltage converter means for converting an unknown analog voltage to a binary digital signal representation thereof, comprising, in combination: a register means having a plurality of binary stages each capable of storing binary zero or binary one signals, each of said stages corresponding respectively to a different one of the bits of said digital signal representation; the most significant binary bit signal of said register being given a weight by said converter equal to the sum of the weights given to the remaining binary bit signals, said most significant bit signal representing the sign of said analog voltage, each of said binary stages being coupled to said converter means; comparator means for comparing the analog voltage from said converter means to said unknown analog voltage; and means for successively and individually changing the individual stages of said register means from a binary zero to a binary one signal representation, beginning with the most significant binary stage; means responsive to said most significant bit signal of said register means for applying the binary bit signals in said register to said converter, and means responsive to said comparator means for successively and individually returning each of said binary stages from a binary one to binary zero representation only in the event that the absolute value of the quantity represented by said register means exceeds that represented by said unknown analog voltage.

7. In a system, including a digital-to-analog converter means, for converting an unknown analog voltage to a binary digital signal representation thereof, the combination of: a digital register means having a plurality of binary stages for storing said digital signal representation; each of said stages corresponding respectively to a different one of the binary bits of said digital signal representation, one of said stages representing the algebraic sign of said digital signal representation and having a binary significance equal to the sum of the binary significances of the remaining stages of said register means less the binary significance of the least significant one of said stages; means to successively switch each of said binary stages from a binary zero to a binary one signal representation beginning with the most significant; means responsive to the binary one signal representation of said sign stage for coupling the binary output signal representation to each of said stages to said converter means; means responsive to the binary zero signal representation of said sign stage for coupling the binary complement of each of said stages to said converter means; comparator means for comparing the analog voltage of said converter means to said unknown analog voltage; and means responsive to said comparator means for successively and individually returning each of said binary stages from a binary one to binary zero signal representation in the event that the absolute value of the number represented by said register means exceeds that represented by said unknown analog voltage.

8. In a system, including a digital-to-analog converter means, for converting an unknown analog signal to a binary digital signal representation thereof, the combination of: a digital register means having a plurality of binary stages for storing said digital signal representation; each of said stages corresponding respectively to a different one of the binary bits of said digital signal representation, one of said stages representing the algebraic sign of said digital signal representation and having a binary significance equal to the sum of the binary significances of the remaining stages of said register means less the binary significance of the least significant one of said stages; means to successively store a binary one signal in each of said binary stages beginning with the most significant; means responsive to said sign stage for coupling the binary signal representation of each of said stages to said converter means; means responsive to the binary zero signal representation of said sign stage for coupling the binary complement of each of said stages to said converter, means for scaling said unknown analog voltage to a value to match the analog signal obtained from said converter means; comparator means for comparing the analog signal of said converter means to said scaled unkown analog signal; and means responsive to said comparator means for successively and individually returning each of said binary stages from binary one to binary zero in the event that the absolute value of the quantity represented by said register means exceeds that represented by said unknown analog voltage.

9. Apparatus for converting from an unknown analog signal to a binary signal representation of said analog signal comprising a digital-to-analog converter means for converting from a binary signal to an analog signal, a register means coupled to the input of said converter means for storing the individual binary bit signals making up said binary representation, said register means also including a binary bit signal representing the sign of said unknown analog signal and having a binary weight equal to the sum of the weights of the remaining binary bits less the weight of the least significant one of said binary bits, comparator means coupled to the output of said register means for comparing said converter analog signal to said unknown analog signal, means for successively changing the binary bit signals of said register means from binary zero to binary one representations beginning with the most significant bit, means responsive to said comparator means for successively returning each of said binary bit signals in said register means to zero in the event that said converter analog signal exceeds said unknown analog signal, and means responsive to said sign binary bit signal for coupling the binary complements of each of said binary bit signals to said converter means.

10. Apparatus employing a digital-to-analog signal converter means for converting an unknown analog signal to a digital signal representation of said analog signal comprising, in combination, a plurality of flip-flops, each having binary one and binary zero outputs and corresponding set and reset inputs for storing said digital signal representation, one of said flip-flops being adapted to store a binary signal representing the polarity of said unknown signal, said one flip-flop one output being connected to said converter; means for sequentially applying set signals to the set inputs of each of said flip-flops beginning with that flip-storing the most significant binary bit and continuing in the order of significance to that flip-flop storing the least significant binary bit thereby to change each of said flip-flops from a binary zero to a binary one representation, a comparator means for comparing said unknown signal to said converter signal to determine which has the larger amplitude; means responsive to said one flip-flop being set for coupling the one outputs of each of said flip-flops, other than said one flip-flop, to said converter means, and to said one flip-flop being reset for coupling the zero outputs of each of said flip-flops other than said one flip-flop to said converter means; said converter means being adapted to give an analog voltage signal weight to each of said flip-flops according to their binary significance, said one flip-flop being given a weight equal to the sum of the weights given to the rest of said flip-flops less the weight given to the least significant flip-flop; means responsive to said comparator means to reset said one flip-flop only in the event that said converter voltage exceeds said unknown voltage; and means responsive to said comparator means to successively reset each of said flip-flops other than said one flip-flop only in the event alternatively that said converter voltage exceeds said unknown voltage and said one flip-flop is set, and that said unknown voltage exceeds said converter voltage and said one flip-flop is reset.

References Cited by the Examiner

UNITED STATES PATENTS

| | | | |
|---|---|---|---|
| 2,945,220 | 7/1960 | Lesti et al. | |
| 2,970,309 | 1/1961 | Towles. | |
| 2,974,315 | 3/1961 | Lebel et al. | 340—347 |

OTHER REFERENCES

Pages 137 and 138, December 1959, Margopoulos et al., "Analog-Digital, Digital-Analog Sign Handling," IBM Technical Disclosure Bulletin, volume 2, No. 4.

MALCOLM A. MORRISON, *Primary Examiner.*

IRVING L. SRAGOW, *Examiner.*